(12) United States Patent
Kuo

(10) Patent No.: US 8,912,465 B2
(45) Date of Patent: Dec. 16, 2014

(54) LASER ENGRAVING DEVICE

(75) Inventor: Shyr-Cherng Kuo, New Taipei (TW)

(73) Assignee: Legend Laser Inc., New Taipei (TW)

( * ) Notice: Subject to any disclaimer, the term of this patent is extended or adjusted under 35 U.S.C. 154(b) by 310 days.

(21) Appl. No.: 13/604,663

(22) Filed: Sep. 6, 2012

(65) Prior Publication Data

US 2014/0061172 A1 Mar. 6, 2014

(51) Int. Cl.
*B23K 26/08* (2014.01)

(52) U.S. Cl.
CPC .............. *B23K 26/08* (2013.01); *B23K 26/0807* (2013.01)
USPC .................................. 219/121.68; 219/121.78

(58) Field of Classification Search
CPC ....................................................... B23K 26/00
USPC .............. 219/121.67–121.72, 121.78–121.81
See application file for complete search history.

(56) References Cited

U.S. PATENT DOCUMENTS 5,798,927 A * 8/1998 Cutler et al. ................... 700/188

* cited by examiner

*Primary Examiner* — Samuel M Heinrich

(57) ABSTRACT

A laser engraving device which can adjust its machining position is disclosed. The device includes a laser machine for supplying laser beam, a guide rod adjacent to and parallel to the laser machine, a galvanometric scanner coupled to the guide rod and being movable with the guide rod, and a driver disposed at an end of the guide rod for driving the guide rod.

8 Claims, 6 Drawing Sheets

LASER ENGRAVING DEVICE

BACKGROUND OF THE INVENTION

1. Technical Field

The invention relates to laser engraving, particularly to engraving with galvanometers in a large area.

2. Related Art

Laser processing technology has applied in industry for over several decades, for example, applications of welding and cutting. Particularly in the recent years, compact industrial laser becomes popular due to the progress of laser beam sources, a laser engraving device primarily using Nd-YAG laser (i.e. Laser-Marking) is commonly used in metal processing, hand tools, plastic products, electronic components, ceramics, electroplated goods and various gifts.

A general laser processing technique can be divided into two types, which are shown in FIGS. 1 and 2. As shown in FIG. 1, a laser source 10 is fixed at a fixed position. A workpiece 12 is moved by an X-Y carrier 11 and its moving path is controlled by a laser beam, so that the workpiece 12 can be engraved by the laser source 10. FIG. 2 shows the other type, in which the laser source 10a is guided by galvanometers 13, 14 and then focused by a composite lens 15 onto the workpiece 12a after fast scanning. Thus a desired pattern can be obtained. These two conventional treatments have their respective advantages and drawbacks. The former's advantages are a precision treatment position and allowance of treatment in a large area, but its carrier 11 moves slowly so as to make the whole treatment period too long. Particularly, speed and quality of laser treatment will be reduced when the workpiece 12 is too large in size or weight. Thus, it is not suitable for mass production.

However, when the workpiece 12 is too heavy or large to be moved, the efficiency and quality of the laser processing must be disadvantageously affected. More recently, the pen-writing galvanometric scanner appears in the market. But such an approach makes the processing range and the smallest size of laser spot is limited by the focusing lens of the galvanometer. To enlarge the processing range, the focusing lens must be replaced with a one with different focal length. Besides the smallest size of laser spot, the processing height will be increased and the processing exquisiteness will also be varied. The advantages of the latter are a small-sized guiding system, fast treatment and high accuracy, but its drawback is that the treatment area is limited to the composite lens 15 under the galvanometers 13, 14. As shown in FIG. 2, under a situation of large-sized treatment, the composite lens 15 must adjust its working heights 16, 17, 18 to make the focused minimum laser spot become larger. This will reduce treatment accuracy and increase the buying cost of the composite lens 15.

SUMMARY OF THE INVENTION

An object of the invention is to provide a laser engraving device which can improve the efficiency of the laser processing, enhance treatment accuracy and expand the utility range of the laser processing.

To accomplish the above object, the laser engraving device of the invention includes a laser machine for supplying laser beam, a guide rod adjacent to and parallel to the laser machine, a galvanometric scanner coupled to the guide rod and being movable with the guide rod, and a driver disposed at an end of the guide rod for driving the guide rod. When the treatment range exceeds the treatment area of the galvanometer scanner, the galvanometer scanner can be moved to another treatment area to continue treating. This can save the cost of buying a composite lens and solve the abovementioned problem of treatment accuracy.

DETAILED DESCRIPTION OF THE INVENTION

Figure 1:
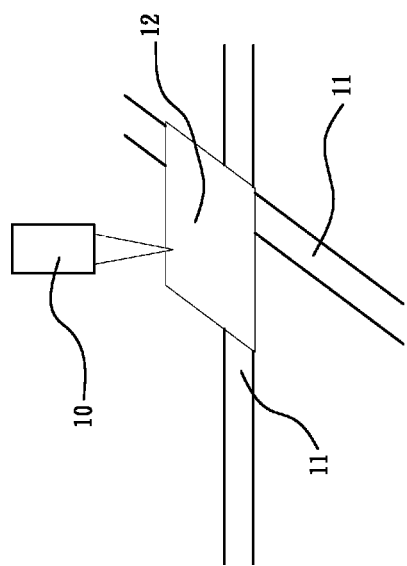
FIG. 1 shows a conventional laser treatment approach.
Figure 2:
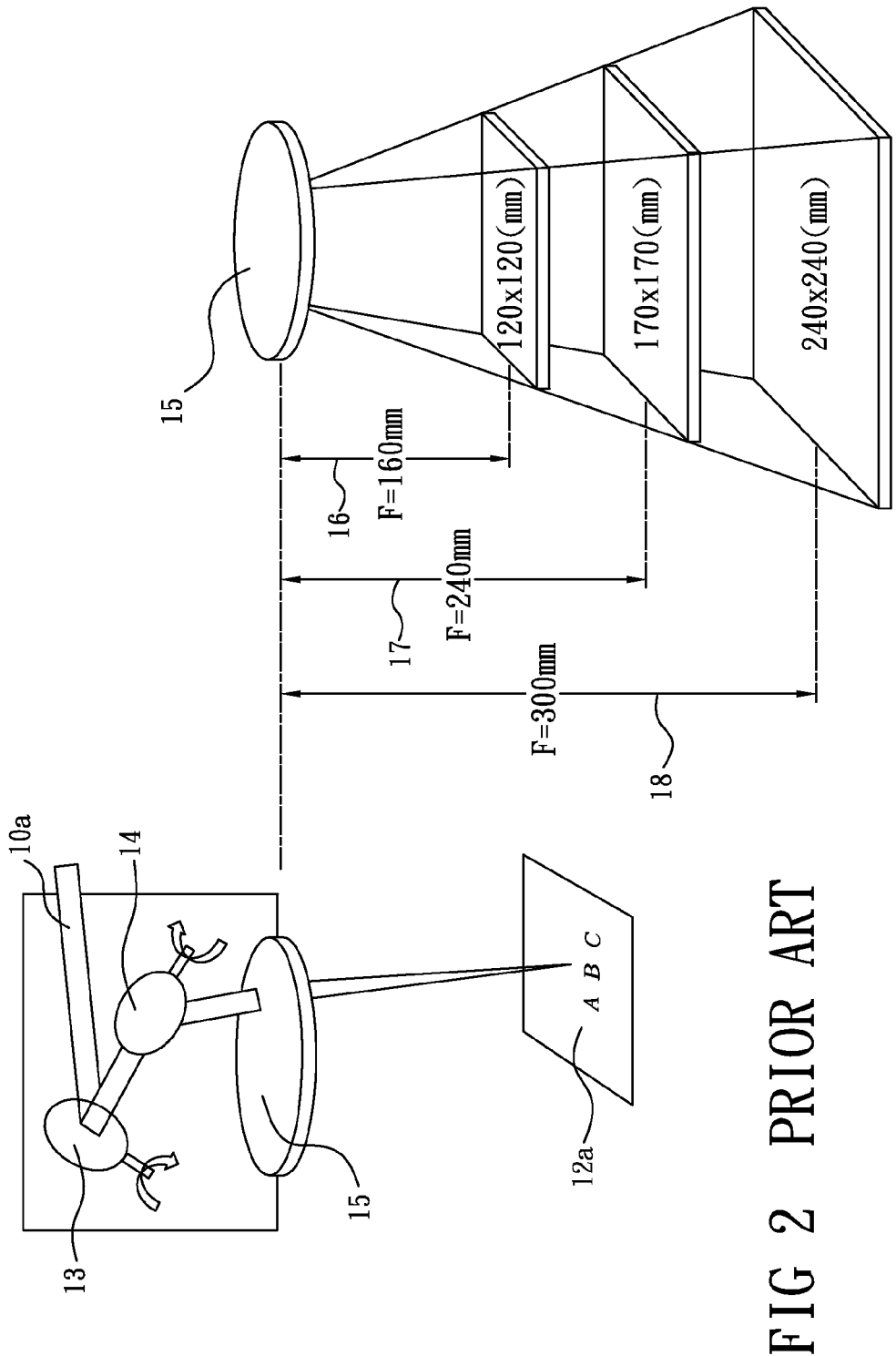
FIG. 2 shows another conventional laser treatment approach.
Figure 3:
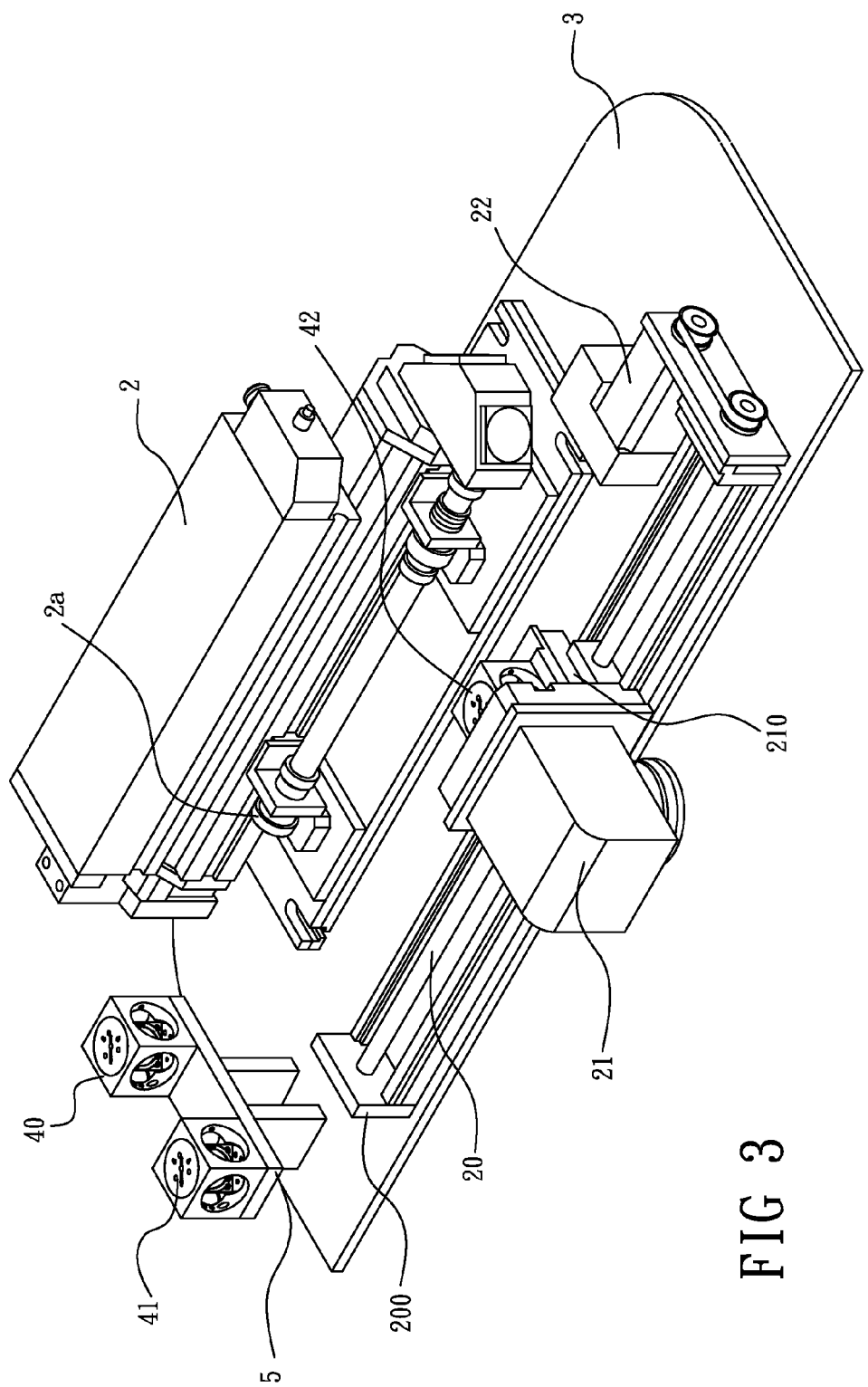
FIG. 3 is a perspective view of the first embodiment of the invention.

Please refer to FIG. 3, which show the first embodiment. The laser engraving device of the invention includes a laser machine 2, a first guide rod 20, a galvanometer scanner 21 and a first driver 22.

The laser machine 2 is used to supply laser beam to the galvanometer scanner 21. The bottom of the laser machine 2 is fixed to a mount 3.

The first guide rod 20, such as a ball screw, is mounted on a base 200 and adjacently and parallelly disposed beside the laser machine 2.

The galvanometer scanner 21 makes the received laser beam yaw to different positions by rotation of the internal galvanometer and focuses the received laser beam on the workpiece to scan and engrave. A seat 210 is coupled on the first guide rod 20 to fasten the galvanometer scanner 21 so that the galvanometer scanner 21 can be moved with the first guide rod 20.

The first driver 22, for example a servo motor, is disposed at an end of the first guide rod 20 for driving the first guide rod 20.

A plurality of mirrors 40 are arranged between the laser machine 2 and the galvanometer scanner 21 for making the laser beam enter the the galvanometer scanner 21. In this embodiment, the mirrors include a first mirror 40, a second mirror 41 and a third mirror 42. The first mirror 40 is arranged at a corresponding position of a light emitter 2a of the laser machine 2 for receiving laser beams. The second mirror 41 is arranged beside the first mirror 40 for turning the laser beam 180 degrees to the third mirror 42. The third mirror 42 is arranged beside the galvanometer scanner 21 and corresponds to the second mirror 41 and the galvanometer scanner 21. The laser beam from the laser machine 2 reflects off the mirrors 40, 41, 42 and is guided to the galvanometer scanner 21 for focusing. The first and second mirrors 40, 41 are installed on a carriage 5 for adjusting the relative position against the galvanometer scanner 21.

When the galvanometer scanner 21 receives the laser beam from the laser machine 2, it will fast yaw and focus the laser beam and scan the workpiece. Also, the first driver 22 drives the first guide rod 20 to move the galvanometer scanner 21 for connecting scanned patterns.

Figure 4:
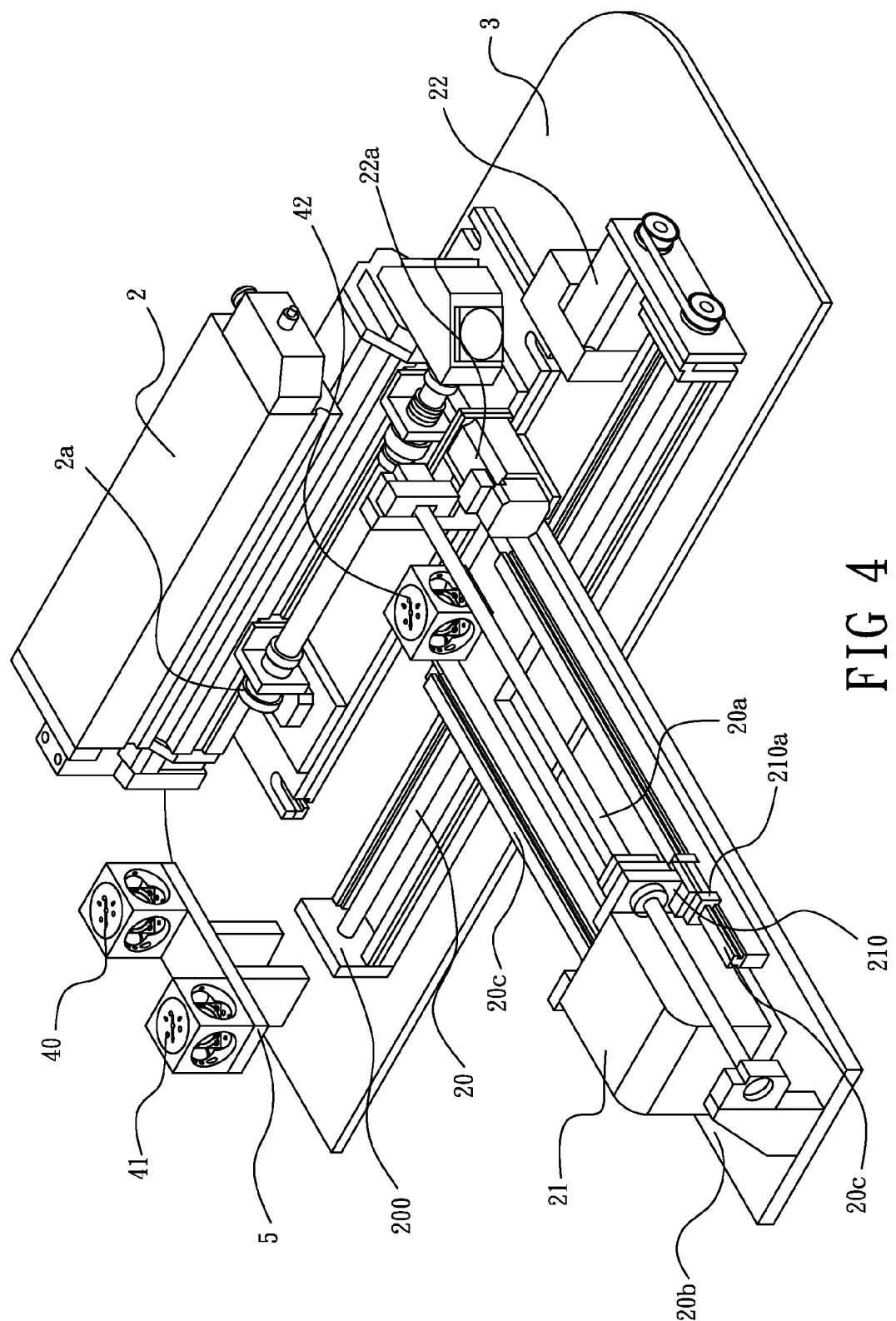
FIG. 4 is a perspective view of the second embodiment of the invention.
Figure 5:
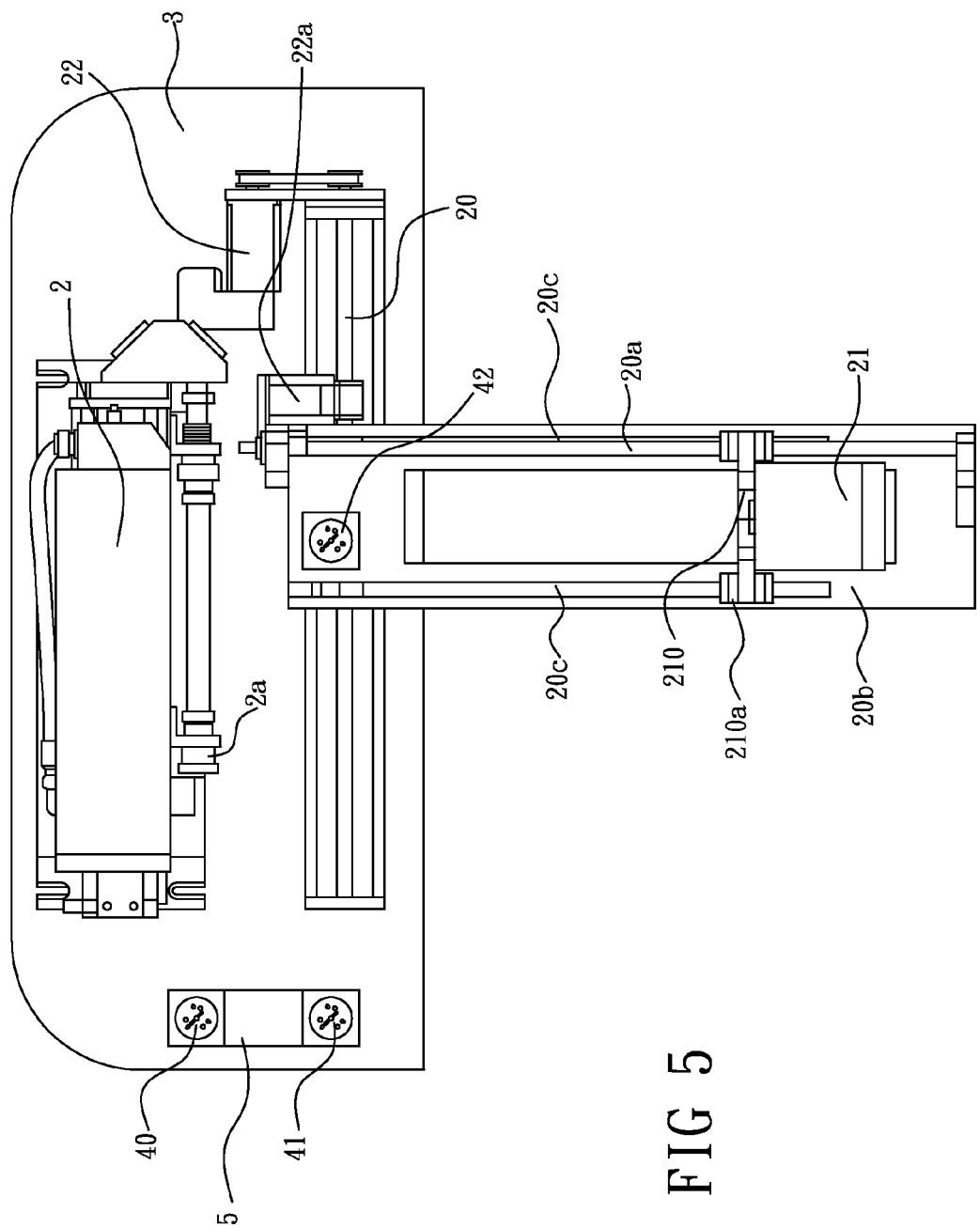
FIG. 5 is a top view of the second embodiment of the invention.
Figure 6:
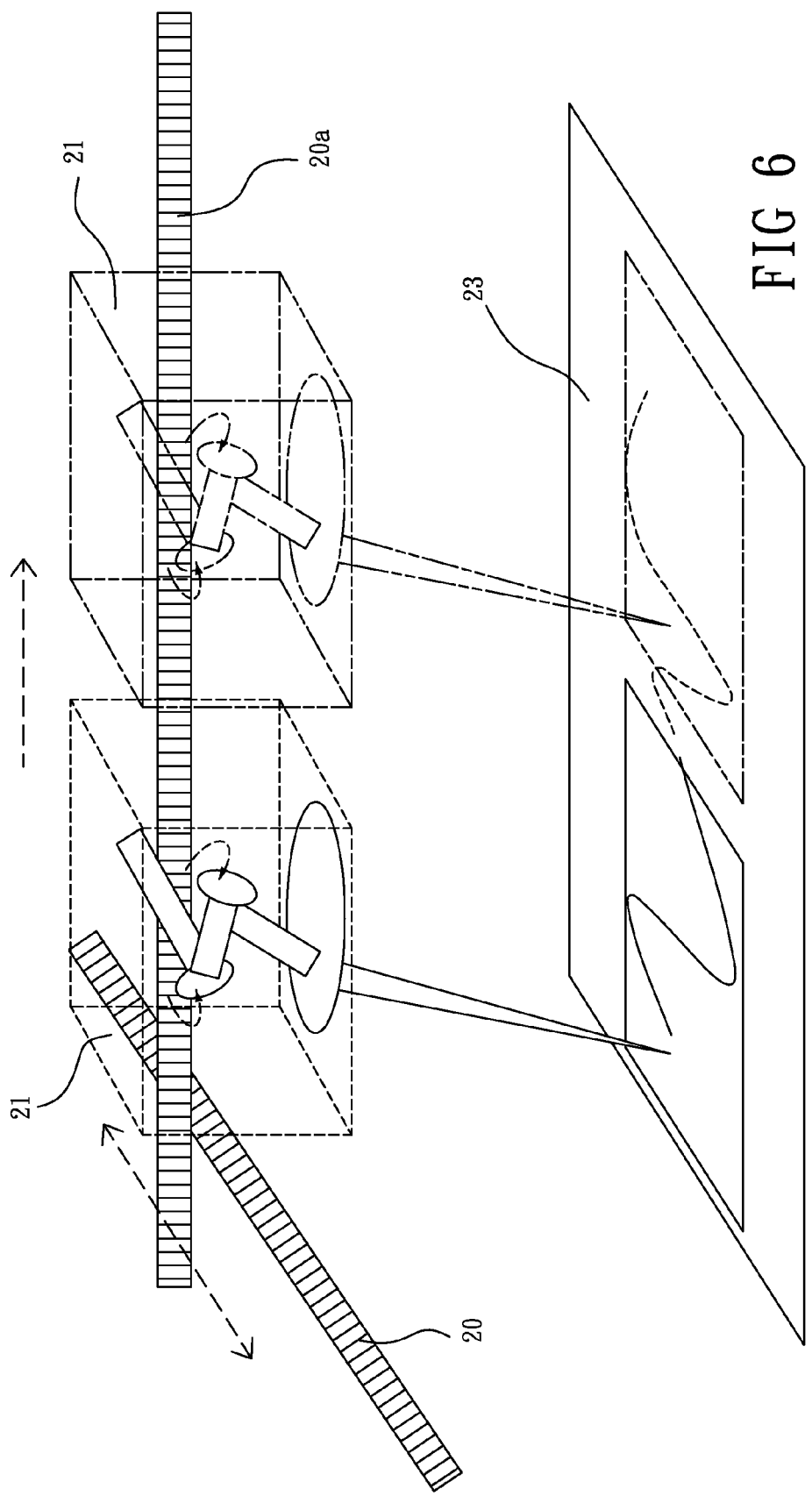
FIG. 6 is a schematic view illustrating the movement of the second embodiment of the invention.

To expand the laser treatment range, the second embodiment of the invention adds a second guide rod 20a and a second guide rod seat 20b as shown in FIGS. 4 and 5. The second guide rod 20a positions on the second guide rod seat 20b and the second guide rod seat 20b is perpendicularly coupled to the first guide rod 20 for being movable with the first guide rod 20. A second driver 22a is connected to an end of the second guide rod 20a for driving the second guide rod 20a. The galvanometer scanner 21 is coupled to the second guide rod 20a through the seat 210 for being movable with the second guide rod 20a. Preferably, each side of the second guide rod seat 20b is provided with a rail 20c, and the bottom of the seat 210 is formed with a trough 210a corresponding to the rail 20c. The trough 210a abuts against the trough 20c for assisting the seat 210 to move on the second guide rod 20a and then stabilizing the movement of the galvanometer scanner 21. As shown in FIG. 6, the X-Y axes-based movement formed by the first and second guide rods 20, 20a can expand the movement range of the galvanometer scanner 21 to increase the laser treatment range for the workpiece 23 and to enhance accuracy of laser treatment.

While the invention has been described by way of an example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A laser engraving device comprising:
   a laser machine for supplying laser beam;
   a guide rod adjacent to and parallel to the laser machine;
   a galvanometer scanner, coupled to the guide rod and being movable with the guide rod; and
   a driver, disposed at an end of the guide rod for driving the guide rod.

2. The laser engraving device of claim 1, further comprising a first mirror a second mirror and a third mirror, wherein the first mirror is arranged at a corresponding position of a light emitter for receiving a laser beam, the second mirror is arranged beside the first mirror for turning the laser beam to the third mirror, and the third mirror is arranged beside the galvanometer scanner and corresponds to the second mirror and the galvanometer scanner.

3. The laser engraving device of claim 2, wherein the guide rod is a ball screw.

4. A laser engraving device comprising:
   a laser machine for supplying laser beam;
   a first guide rod adjacent to and parallel to the laser machine;
   a first driver, disposed at an end of the first guide rod for driving the first guide rod;
   a second guide rod and a second guide rod seat, the second guide rod positioning the second guide rod seat, the second guide rod seat being perpendicularly coupled to the first guide rod for being movable with the first guide rod;
   a second driver, connected to an end of the second guide rod for driving the second guide rod; and
   a galvanometric scanner, coupled to the second guide rod and being movable with the second guide rod.

5. The laser engraving device of claim 4, further comprising a first mirror a second mirror and a third mirror, wherein the first mirror is arranged at a corresponding position of a light emitter for receiving a laser beam, the second mirror is arranged beside the first mirror for turning the laser beam to the third mirror, and the third mirror is arranged beside the galvanometer scanner and corresponds to the second mirror and the galvanometer scanner.

6. The laser engraving device of claim 4, wherein a side of the galvanometer scanner is provided with a seat coupled on the second guide rod, two opposite sides of the second guide rod seat are separately provided with two rails, a bottom of the seat is formed with a trough corresponding to the rail, and the trough abuts against the trough for assisting the seat to move on the second guide rod seat.

7. The laser engraving device of claim 4, wherein each of the first and second guide rods is a ball screw.

8. The laser engraving device of claim 5, wherein the first and second mirrors are installed on a carriage for adjusting a relative position against the galvanometer scanner

\* \* \* \* \*